Patented Oct. 1, 1940

2,216,194

UNITED STATES PATENT OFFICE 2,216,194

PRODUCTION OF ALUMINUM SULPHATE

Ralph S. Hood, Danvers, Mass., assignor to Monsanto Chemical Company, St. Louis, Mo., a corporation of Delaware No Drawing. Application November 28, 1938, Serial No. 242,767

11 Claims. (Cl. 23—123)

This invention relates to the production of aluminum sulphate from sulphuric acid and a material which is rich in alumina.

The principal object of this invention is to obtain substantially complete solution of the alumina without encountering the mechanical difficulties which have hitherto added to the expense of producing aluminum sulphate. Another object is the provision of a method for making anhydrous aluminum sulphate which is substantially as dense as the commercial hydrated material.

Aluminum sulphate is manufactured commercially by the reaction of bauxite, commercial aluminum hydrate or some other acid soluble alumina containing material with sulphuric acid. Water or washing liquors are added so that a neutral or basic solution of aluminum sulphate is obtained which is subsequently boiled down and allowed to crystallize to a solid product. This commercial product usually contains from 16% to 18% soluble alumina and about 45% water. Neutral alum solutions prepared as above may be mixed in proper proportion with alkali sulphates and subsequently crystallized to yield true alum crystals.

The present invention provides a method for producing hydrated aluminum sulphate without the necessity for adding quantities of water which must be subsequently evaporated by boiling, which method still substantially completely extracts the alumina from the raw materials. A method is also provided for preparing a dense anhydrous aluminum sulphate.

According to the present invention, bauxite or some other similar material which is rich in alumina is mixed with sulphuric acid under conditions such that reaction between the constituents is retarded so that the mixture obtained is fluid. To attain this end it is preferable to use acid which is at room temperature or less and, if desired, artificial cooling may be employed during mixing. The mixing should not, of course, extend over any long period of time nor should the mixture obtained be stored for any appreciable period before carrying out the subsequent steps of the process. Any suitable type of mixing apparatus may be employed which will give an intimate, homogeneous slurry within a short time such as a small pug mill, screw conveyor or the like. I have found that satisfactory results are obtained when acid containing 65% to 70% $H_2SO_4$ is employed although strengths as high as 80% give good results and acid as dilute as 40% $H_2SO_4$ may be employed in this process.

It is not essential that the bauxite or other aluminous material should be of any specific size. With very finely divided material it is, of course, necessary to decrease the time of mixing because of the accelerated action obtained. Very coarse particles on the other hand may prevent substantially complete solution of the alumina. For most purposes material which is approximately 60 mesh in size is quite suitable.

The proportion of acid charged may be varied, depending upon the type of product required and upon the subsequent steps adopted. It is sometimes preferable to use a small excess of acid in order to obtain a slightly higher conversion or to produce a product which may be handled more satisfactorily. In such a case it is usually desirable to furnace off the excess acid in order to give a final product which is slightly basic. On the other hand, for many purposes it may be desirable to use a slight excess of alumina.

The slurry which is discharged from the mixer is then fed onto a mass of hot, substantially anhydrous aluminum sulphate. A rotating furnace is quite suitable for this addition, with the slurry mixture and hot sulphate being fed in concurrently so that the mixture falls on the sulphate. In this furnace the reaction of the acid and alumina is completed to give a substantially theoretical conversion to aluminum sulphate and at the same time sufficient water may be evaporated to form a hydrate containing a higher ratio of $Al_2O_3$ to water than that present in the minimum melting hydrate of the series encountered when commercial hydrated aluminum sulphate is dehydrated. To accomplish this result the end temperature should not be substantially below 110° C. and preferably not below about 125° C. since otherwise sticking will occur. A discharge temperature of 200° C. is quite satisfactory to attain these conditions. The temperature of the aluminum sulphate, which is fed into the furnace, may be approximately 500° C., thus avoiding any sticking of the mass to the walls of the furnace. The proportion of hot anhydrous sulphate will depend upon the temperature at which it is fed into the furnace and is likewise dependent upon whether additional heat is added, as by the use of a flame or hot gases. Sufficient anhydrous material to prevent caking on the walls of the furnace by the reacting mixture should be employed. If the conditions outlined above are observed a hydrated aluminum sulphate having a lower proportion of water than that present in the minimum melting hydrate is produced directly. This result is attained without at any time encountering the semi-fluid, sticky mass which forms concrete-like incrustations on equipment, a phase characteristic of the dehydration of commercial aluminum sulphate. The importance of this is readily apparent since the difficulties in passing through this sticky stage have hitherto rendered the production of anhydrous aluminum sulphate commercially impracticable. The removal of the water from the hydrate produced according to this invention is quickly and easily accomplished by merely applying heat. Since the proportion of water is less than that in the minimum melting hydrate, the problem of passing through the sticky stage is not presented.

If an anhydrous product is desired, as is usually the case, the product of the furnace may be further calcined at temperatures up to 650° C. to drive off the remainder of the water. A portion of this material may then be used as the hot anhydrous sulphate with which the slurry is mixed. Such a procedure conserves and utilizes at least part of the heat required for calcination.

The furnace and calciner may be constructed as one piece of apparatus merely by establishing a suitable temperature gradient therein. Excess $SO_3$ which is furnaced off may be collected for re-use in the process or otherwise.

The anhydrous aluminum sulphate obtained by this process contains less than 5% of insoluble matter and has substantially all the alumina in the form of aluminum sulphate. Moreover, the product is much denser than the anhydrous materials usually obtained and is substantially as dense as commercial hydrated aluminum sulphate. This property is extremely important for many purposes since one of the advantages of anhydrous aluminum sulphate is that the removal of the water should permit a decrease in bulk for the same alumina concentration. Where the density is decreased by the dehydration much of this advantage may be lost since the dehydrated product may be almost as bulky as the hydrate. In fact this is the situation usually encountered in the preparation of anhydrous aluminum sulphate. Rather than increasing the quantity of $Al_2O_3$ in a given volume of sulphate product by dehydration, it is found that the quantity of $Al_2O_3$ remains substantially constant. It was often doubtful if there was sufficient saving on freight, packaging, etc. to repay the cost of dehydration. The present invention obviates this disadvantage inherent in previous processes since the product so obtained is substantially as dense as the commercial hydrate. A given volume of the product of the present process contains nearly twice as much $Al_2O_3$ as either the commercial hydrate or the anhydrous material previously produced. Packaging and storage as well as freight costs are cut nearly in half.

The hydrated aluminum sulphate obtained by this process contains substantially all of the alumina content of the bauxite in soluble form. This result is attained even though theoretical proportions of reactants are employed, the acid efficiency of this method being substantially 100%. Aluminum sulphate free of impurities and insolubles may be obtained by using pure alumina as the aluminous material.

Clean sulphuric acid is not necessary for this purpose, but any form of waste or by-product acid can be used, such as sludge acid from petroleum purification processes and waste sulphonation acid from a variety of technical processes. The organic impurities contained in these waste acids are volatilized during the calcination.

From the foregoing it will be apparent that the instant invention provides a simple and economical method for preparing either hydrated aluminum sulphate or an anhydrous product without encountering the mechanical difficulties hitherto caused by the low melting hydrate of aluminum sulphate. In addition, the anhydrous product obtained is substantially as dense as the hydrated material thus conserving the advantage obtained by removal of the water of hydration.

Although the products described herein have been referred to as hydrates, it is not altogether certain that they actually exit as such, and in fact water present therein may be in the free state. In view of this, the hydrated products referred to herein might also be described as solid hydrous products.

What is claimed is:

1. The method of preparing aluminum sulphate comprising mixing together sulphuric acid and a material rich in alumina under conditions whereby reaction is retarded, and a fluid mixture is obtained then adding the fluid mixture to substantially anhydrous, hot aluminum sulphate and allowing it to remain in contact therewith until the alumina is substantially completely converted to aluminum sulphate.

2. The method of preparing anhydrous aluminum sulphate comprising mixing together sulphuric acid and a material rich in alumina under conditions whereby reaction is retarded, and a fluid mixture is obtained then adding the fluid mixture to substantially anhydrous, hot aluminum sulphate and allowing it to remain in contact therewith until the alumina is substantially completely converted to aluminum sulphate, followed by dehydration of the aluminum sulphate.

3. The method of preparing aluminum sulphate comprising mixing together sulphuric acid and a material rich in alumina under conditions whereby reaction is retarded, and a fluid mixture is obtained then adding the fluid mixture to sufficient substantially anhydrous hot aluminum sulphate to prevent the mixture's adhering to the walls of the container and allowing the mixture to remain in contact with the hot anhydrous sulphate until the alumina is substantially completely converted to aluminum sulphate.

4. The method of preparing aluminum sulphate comprising mixing together sulphuric acid and a material rich in alumina under conditions whereby temperature rise is inhibited and a fluid mixture is obtained, then adding the fluid mixture to substantially anhydrous, hot aluminum sulphate and allowing it to remain in contact therewith until the alumina is substantially completely converted to aluminum sulphate.

5. The method of preparing aluminum sulphate comprising mixing together sulphuric acid and a material rich in alumina under conditions whereby reaction is retarded, and a fluid mixture is obtained then adding the fluid mixture to substantially anhydrous, hot aluminum sulphate and allowing it to remain in contact therewith until the alumina is substantially completely converted to aluminum sulphate, and is at a temperature of at least 110° C.

6. The method of preparing aluminum sulphate comprising mixing together sulphuric acid and a material rich in alumina under conditions whereby reaction is retarded, and a fluid mixture is obtained then adding the fluid mixture to substantially anhydrous, hot aluminum sulphate and allowing it to remain in contact therewith until the alumina is substantially completely converted to aluminum sulphate, followed by dehydration of the aluminum sulphate whereby a substantially anhydrous aluminum sulphate having a density substantially as great as commercial solid hydrous aluminum sulphate is obtained.

7. The method of preparing aluminum sulphate comprising mixing together sulphuric acid containing from 40% to 80% H2SO4 and a material rich in alumina under conditions whereby reaction is retarded and a fluid mixture is obtained, then adding the fluid mixture to substantially anhydrous, hot aluminum sulphate and allowing it to remain in contact therewith until the alumina is substantially completely converted to aluminum sulphate.

8. The method of preparing aluminum sulphate comprising mixing together approximately theoretical proportions of sulphuric acid and a material rich in alumina under conditions whereby reaction is retarded and a fluid mixture is obtained, then adding the fluid mixture to substantially anhydrous, hot aluminum sulphate and allowing it to remain in contact therewith until the alumina is substantially completely converted to aluminum sulphate.

9. The method of preparing aluminum sulphate which comprises mixing a partially reacted fluid mixture of sulphuric acid and a material rich in alumina with substantially anhydrous, hot aluminum sulphate and allowing it to remain in contact therewith until the alumina is substantially completely converted to aluminum sulphate.

10. The method of preparing aluminum sulphate which comprises mixing a partially reacted plastic mixture of sulphuric acid and a material rich in alumina with substantially anhydrous, hot aluminum sulphate and allowing it to remain in contact therewith until the alumina is substantially completely converted to aluminum sulphate.

11. The method of preparing dense anhydrous aluminum sulphate comprising mixing together sulphuric acid and a material rich in alumina under conditions whereby reaction is retarded, and a fluid mixture is obtained then adding the fluid mixture to substantially anhydrous, hot aluminum sulphate and allowing it to remain in contact therewith until the alumina is substantially completely converted to aluminum sulphate, followed by dehydration of the aluminum sulphate, whereby an hydrous product is obtained having substantially the density of commercial hydrated aluminum sulphate.

RALPH S. HOOD.

CERTIFICATE OF CORRECTION.

Patent No. 2,216,194.   October 1, 1940.

RALPH S. HOOD.

It is hereby certified that error appears in the printed specification of the above numbered patent requiring correction as follows: Page 2, second column, line 13, for the word "exit" read --exist--; page 3, second column, line 24, claim 11, for "hydrous" read --anhydrous--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.